3,336,302
NOVEL 19-OXYGENATED-B-NOR-ANDROSTANES
Kenneth G. Holden, Stratford, N.J., and James F. Kerwin, Broomall, Pa., assignors to Smith Kline & French Laboratories, Philadelphia, Pa., a corporation of Pennsylvania
No Drawing. Filed June 1, 1965, Ser. No. 460,573
13 Claims. (Cl. 260—239.55)

This application is a continuation in part of copending Ser. No. 440,284, filed Mar. 16, 1965, now U.S. Patent 3,284,505, which is in turn a continuation in part of copending Ser. No. 358,417, filed Apr. 8, 1964, now abandoned.

This invention relates to novel 19-nor-B-nortestosterones as well as to methods and intermediates for preparing same. The 19-nor-B-nortestosterones of this invention have utility as medicinal agents particularly having depressant or antiandrogenic activity as well as intermediates for preparing other 19-nor-B-norsteroid medicinal agents having similar activities.

More specifically the end products of this invention are illustrated by the following structural formula:

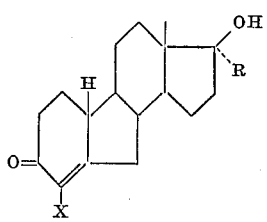

Formula I in which R represents lower alkyl such as methyl or ethyl, ethynyl, and hydrogen; and X represents hydrogen, acetoxy, hydroxy or halo such as fluoro, bromo or chloro. As usual in the steroid art the acyl derivatives of these compounds can be optionally prepared by art recognized methods especially those acylates derived from carboxylic acids having a maximum of 8 carbon atoms preferably acetyl. Also, the B-nortestosterones (Formula I) in which R is hydrogen can be optionally converted to their cyclohexenyl, cyclopentyl or tetrahydropyranyl ether derivatives.

The compounds of this invention are prepared as described in the following reaction sequence using a 3,19-dihydro-androst-5-en-17 one [(I), J. Kalvoda, et al., Helv. Acta., 46, 1361 (1963)] or its acylate derivative as starting material.

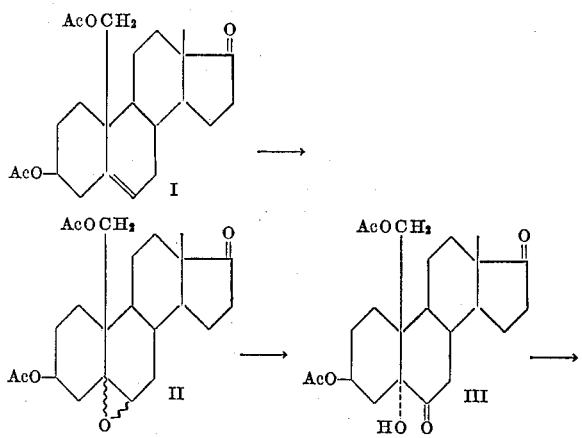

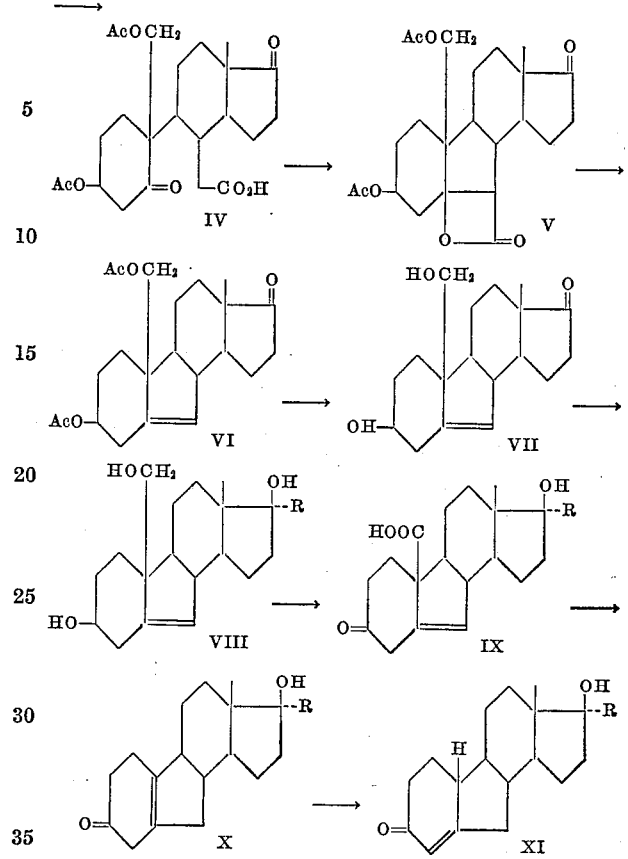

In this reaction sequence Ac represents any art recognized acyl group such as those described hereabove. Acetyl is most convenient. R represents lower alkyl or alkynyl.

This reaction sequence essentially comprises contracting the B ring of a 19-functionalized steroid, degrading the 19-function to give the 19-nor-B-norandrost-17-one then inserting the desired function at C—17. This general reaction can be accomplished by several synthetic variations of this idea as will be obvious to those skilled in the art but is illustrated by the sequences I→XI and I→VII→XVI described herein.

3β,19-diacetoxy-androst-5-en-17-one (I) is oxidized to the oxido or epoxy group at C—6,7 using standard mild oxidizing agents such as a peracid, for example, perbenzoic acid or m-chloroperbenzoic acid in an inert organic solvent in which the reactants are substantially soluble at moderate temperatures such as at about room temperature or lower. The resulting 5,6-epoxy isomeric mixture (II) is oxidized gently at C—5,6 to the 5α-hydroxy-6-keto compound (III) usually with chromic acid or anhydride in an aqueous-organic solvent mixture at temperatures lower than about 40–50° C.

The dione (III) is oxidized to the 5,6-seco derivative (IV) using a mild oxidizing agent such as a perbenzoic acid in a suitable, inert organic solvent at temperatures under room temperature (30° C.). The seco compound is cyclized using benzoyl chloride-pyridine to the 5,6-lactone which is degraded by pyrolysis to the important intermediate 3β,19-dihydroxy-B-norandrost-5-en-17-one (VII). This synthetic method of degrading ring B is generally similar to those reported by K. Tanabe et al., U.S. Patent No. 3,061,635.

The important 17α-alkyl derivatives of this invention are prepared by reacting VII or its O-acylate preferably acetate derivative with a lower alkyl metal compound such as methyl or ethyl lithium or with the corresponding Grignard reagents such as lower alkyl magnesium bromide, iodide or chlorides in an inert solvent such as tetrahydrofuran or ether most conveniently at reflux temperature to give a 3β,17β,19-trihydroxy-17α-alkyl-B-norandrost-5-ene (VIII) which is oxidized at C—19 with chromic acid in aqueous acetone at about 0–5° C. to the 10-carboxy-B-nor compound (IX) which is then decarboxylated usually by pyrolysis. The decarboxylation may be run by pyrolysis under basic conditions such as in a tertiary base, i.e., pyridine, to give the important 19-nor-5(10)ene intermediate (X). This compound (X) is rearranged usually by reaction with sodium methoxide-methanol into the desired 17α-alkyl-19-nor-B-nortestosterone. Alternatively, the decarboxylation can be carried out under acid conditions, such as using Girard T reagent. In this case the desired 19-nor-B-nor-4-androstane is obtained directly (i.e., XII→XIV below).

The testosterone compounds, i.e., those in which R is hydrogen, are prepared from 3β,19-dihydroxy-B-norandrost-5-en-17-one (VII) as follows:

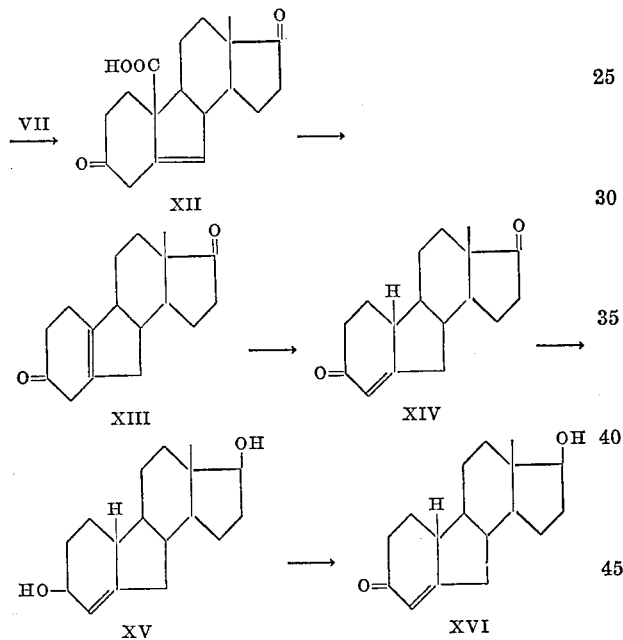

VII is oxidized using standard chromic acid in acetone in the cold as described to form the 3-one-10-carboxy compound which is then decarboxylated by heating at reflux in pyridine to the 5(10)ene (XIII). This compound is rearranged with sodium methoxide-methanol to the important intermediate 19-nor-B-norandrost-4-ene-3,17-dione (XIV).

XIV is reduced to convert the keto groups at C—3 and C—17 into hydroxyls using lithium aluminum hydride in ether, tetrahydrofuran or mixtures thereof at from room to reflux temperature. Reaction of the resulting 3β,17β-dihydroxy-19-nor-B-norandrost-4-ene (XV) with 2,3-dichloro-5,6-dicyanobenzoquinone in dioxane gives the desired 19-nor-B-nortestosterone (XVI).

The compounds of Formula I in which X is other than hydrogen are prepared by reactions on the 19-nor-B-nortestosterone or its 4,5-epoxide derivative directly, such as sulfuryl chloride in organic solvent on the testosterone or hydrogen halide on the epoxide which is in turn prepared from the testosterone parent using perbenzoic acid.

The 17-alkyl-B-nortestosterones possess a tendency to dehydrate at position 17 under direct treatment and are, therefore, prepared indirectly as noted in the examples.

The acyl derivatives of the 19-nor-B-nortestosterones of this invention are prepared by reacting the testosterone parent with an acyl halide or anhydride usually in excess in the presence of base with an organic solvent optionally present. The 19-nor-B-nortestosterone acylates are usually prepared with an excess of acyl anhydride in pyridine at room temperature or with slight warming. Quenching in water gives the desired 17-acylate. The 17α-alkyl-19-nor-B-nortestosterone acylates are prepared using more vigorous conditions such as at reflux using an excess of the anhydride. Generally speaking the carbon content of such O-acylate derivatives will not exceed 12.

The tetrahydropyranyl ether derivatives are prepared by reacting the testosterones of Formula 1 with dihydropyrane in benzene in the presence of p-toluenesulfonic acid. The cyclohexenyl and cyclopentenyl ethers are prepared by reacting the same compounds with cyclohexanone or cyclopentanone dimethyl acetate in the presence of p-toluenesulfonic acid. The cyclopentenylether of B-nor-19-nortestosterone is a particularly potent antiandrogenic agent.

The 17α-alkyl and unsubstituted 19-nor-B-nortestosterones of this invention are active central nervous system depressant and antiandrogenic agents. The other compounds disclosed herein have utility as intermediates for preparing these 19-nor-B-nortestosterone derivatives.

The compounds covered in this application are characterized by having oxygenated carbon atoms at position 19, i.e., such as a hydroxymethylene or a carboxy group substituted on a B-norandrostane nucleus. All of these compounds are of use as intermediates for preparing 19-nor-B-nortestosterone derivatives having antiandrogenic activity. The 19-oxygenated compounds claimed here have also been found to have potent antiandrogenic and antianabolic activity with little C.N.S. depressant activity.

The compounds especially active as antiandrogenic compounds are those possessing the following basic structural formula:

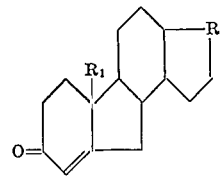

in which $R_1$ is carboxy or hydroxymethylene and R is

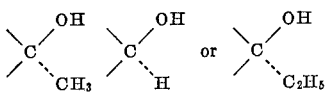

Derivatives of these compounds obvious to those skilled in the art, especially those as described herein such as O-acyl derivatives, 4-substituted compounds or ether derivatives are equivalent to these parent compounds.

Among the processes of the invention as described hereabove the process of oxidation of the 19-hydroxymethylene-B-norandrostane to form the 19-carboxy-B-norandrostane using the Jones reagent is of particular importance. The oxidation is carried out in a ketonic solvent such as acetone or methyl ethyl ketone using standard Jones reagent (chromic acid in dilute sulfuric acid) usually in the cold such as from about 0–10° C. Other variations in the reaction conditions of this process will be apparent to those skilled in the art from Bowden et al., J. Chem. Soc., 1946, 39, or "Steroids," Fieser, 1959, pp. 52 and 224.

Also part of this invention is the method of decarboxylation of 19-carboxy-B-norandrostanes comprising pyrolysis usually under basic conditions such as heating usually at reflux temperature in a tertiary amine such as pyridine, lutidine, etc. for about 1–4 hours. The resulting compound is the $\Delta^{5,10}$-B-norandrostene which is rearranged by brief treatment with an inorganic acid such as hydrochloric acid or a medium strength base such as sodium methoxide-methanol or methanolic sodium hydroxide with mild heat such as on the steam bath for up to 30 minutes. Alternatively the decarboxylation can be carried out under similar mild acid conditions.

It will be obvious to those skilled in the steroid art that variations of this invention can be made without departing from the nub, i.e., the 19-nor-B-nortestosterone structure, as described above. For example, the starting material can contain inert substituents such as a 16α or 16β-methyl group or alternative but equivalent reaction conditions known to the art for converting discrete moieties as desired may be used. Such are meant to be included in this invention. The following examples are designed only to illustrate further the practice of this invention.

EXAMPLE 1

To a solution of 43.6 g. of 3β,19-diacetoxyandrost-5-en-17-one (I, Ac=acetyl) [see J. Kalvoda et al., Helv. Chim. Acta., 46, 1361 (1963)] in 300 ml. of chloroform is added 25.8 g. of m-chloroperbenzoic acid in 150 ml. of chloroform. The addition is carried out with stirring so that the temperature of the reaction mixture is maintained at 25–30° C. After addition is complete the reaction mixture is allowed to stand for three hours and is then washed with aqueous sodium sulfite and then with aqueous sodium carbonate solution. Drying and evaporation of the chloroform phase gives a residue which is crystallized from acetone-hexane to give 3β,19-diacetoxy-5,6-epoxyandrostan-17-one (II), M.P. 128–129° C.

To a stirred solution of 3β,19-diacetoxy-5,6-epoxyandrostan-17-one (II, 42 g.) in 1200 ml. of methylethylketone is added aqueous chromic acid (50 g. of chromium trioxide in 100 ml. of water) at such a rate that the temperature of the reaction mixture does not exceed 40° C. After addition is complete the reaction mixture is maintained at 40° C. for one hour and is then poured into 2500 ml. of water. Extraction with methylene chloride followed by drying and evaporation of the organic extracts gives crude 3β,19-diacetoxy-5α-hydroxyandrostan-6,17-dione (III) which may be used in the next step without purification.

To a solution 42 g. of the crude dione in 200 ml. of chloroform is added 50 g. of m-chloroperbenzoic acid in 350 ml. of chloroform. The addition is carried out slowly with stirring so that the reaction temperature does not rise above 30° C. After stirring at room temperature for 24 hours the reaction mixture is washed with 10% aqueous sodium sulfite solution (500 ml.) and then with 5% aqueous sodium bicarbonate solution (700 ml.). The sodium bicarbonate phase is acidified with phosphoric acid and extracted with chloroform to give, after drying and evaporation of the chloroform a mixture of m-chlorobenzoic acid and 3β,19-diacetoxy-5,17-dioxo-5,6-secoandrostan-6-oic acid (IV).

The above mixture is dissolved in 150 ml. of pyridine and treated with 50 ml. of benzoyl chloride with cooling. After standing for 24 hours at room temperature the reaction mixture is poured into 1500 ml. of water and extracted with methylene chloride. After washing with cold aqueous phosphoric acid and sodium carbonate solutions the methylene chloride extracts are combined, dried and evaporated. The residue may be crystallized from ether to give 3β,19-diacetoxy-5β-hydroxy-17-oxo-B-norandrostan-6-oic acid 5,6 lactone [(V), M.P. 170° C. (dec.)], or more conveniently, the crude residue is heated at 190° C., under a nitrogen atmosphere for ten minutes to give crude 3β,19-diacetoxy-B-norandrost-5-ene-17-one (VI) which is dissolved in ethanol containing excess aqueous potassium hydroxide solution and heated at reflux for two hours. The cooled reaction mixture is poured into water and extracted with methylene chloride to give, after drying and evaporation of the methylene chloride phase, 815 g. of a residue. This material is dissolved in benzene/methylene chloride (9:1) and chromatographed on 125 g. of alumina (III, Woelm). Elution with methylene chloride and methylene chloride-methanol mixtures gives 3β,19-dihydroxy-B-norandrost-5-en-17-one (VII) which, after recrystallization from acetone-hexane, melts at 148–150° C.

EXAMPLE 2

A solution of 3.0 g. of 3β,19-dihydroxy-B-norandrost-5-en-17-one (VII, Example 1) in 100 ml. of tetrahydrofuran is treated with 7.0 g. of methyl lithium. The reaction mixture is heated at reflux under a nitrogen atmosphere for two hours and is then cooled and treated with methanol to destroy excess methyl lithium and the resulting mixture is then poured into water and extracted with methylene chloride to give, after drying and evaporation of the solvent, 3β,17β,19-trihydroxy-17α-methyl-B-norandrost-5-ene (VIII).

The crude triol (VII) is dissolved in 35 ml. of acetone and added to a solution of 12 ml. of standard chromic acid reagent (26.7 g. of chromium trioxide and 23 ml. of concentrated sulfuric acid diluted to 100 ml. with water) in 40 ml. of acetone at 0° C. After stirring for six minutes the reaction mixture is poured into water and extracted with methylene chloride. The methylene chloride extracts are combined and extracted with aqueous sodium bicarbonate solution which on acidification and extraction with methylene chloride yields 17β-hydroxy-17α-methyl-3-oxo-B-norandrost-5-en-19-oic acid (IX) after drying and evaporation of the solvent.

The crude acid (IX) is dissolved in pyridine and heated at reflux for one hour. The pyridine is evaporated at reduced pressure to leave a residue at 17β-hydroxy-17α-methyl-19-nor-B-norandrost-5(10)-en-3-one (X).

The ketone (X) is dissolved in 50 ml. of methanol containing 0.1 g. of sodium methoxide then heated at reflux for one hour. The cooled reaction mixture is poured into water and extracted with methylene chloride. Drying and evaporation of the methylene chloride extracts gives a residue which is purified by column chromatography on alumina followed by crystallization from acetone-hexane to give 17α-methyl-19-nor-B-nortestosterone (XI), M.P. 150–151° C.

XI (500 mg.) in 25 ml. of acetic anhydride is heated at reflux overnight then quenched in water to give the acetate derivative.

Substitution of ethyl lithium for methyl lithium in the reaction described above gives 17α-ethyl-19-nor-B-nortestosterone.

Substitution of ethynyl magnesium bromide for methyl lithium and using the diacetate derivative of 3β,19-dihydroxy-B-norandrost-5-en-17-one in tetrahydrofuran, above, gives 17α-ethynyl-19-nor-B-nortestosterone.

EXAMPLE 3

Oxidation of 4.0 g. of 3β,19-dihydroxy-B-norandrost-5-en-17-one (VII) by the method used for 3β,17β,19-trihydroxy-17α-methyl-B-norandrost-5-ene (VIII) gives 3.23 g. of crude 3,17-dioxo-B-norandrost-5-en-19-oic acid (XII) which is decarboxylated and rearranged as described for the 17α-methyl-17β-hydroxy series to give 19-nor-B-norandrost-4-ene-3,17-dione (XIV), M.P. 150–153° C., via 19-nor-B-norandrost-5(10)ene-3,17-dione (XIII).

Alternatively, XII is reacted with Girard T reagent [Gardi et al., Gazz. Chim. Ital., 93, 514 (1963)] to give the intermediate hydrazone which is then decomposed using mineral acid at room temperature (see Example 7).

To a stirred suspension of 1.05 g. of lithium aluminum hydride in 75 ml. of ether is added a solution of 1.6 g. of the dione (XIV) in 35 ml. of tetrahydrofuran. The addition is carried out at room temperature, with stirring over a 15 minute period. The reaction mixture is then heated to reflux for two hours, cooled, treated with 5 ml. of water and filtered. Evaporation of the filtrate gives a residue of 3β,17β-dihydroxy-19-nor-B-norandrost-4-ene (XV).

The crude diol (XV) is dissolved in 50 ml. of dioxane to which is added a solution of 2.5 g. of 2,3-dichloro-5,6- dicyanobenzoquinone in 50 ml. of dioxane. After eight hours at room temperature the precipitated hydroquinone is removed by filtration and the filtrate is evaporated to a residue which is dissolved in methylene chloride and passed through a column of 30 g. of alumina (III, Woelm). Evaporation of the eluate gives a residue which after recrystallization from acetone-hexane melts at 135–136° C. and is 19-nor-B-nortestosterone (XVI).

This material (200 mg.) is dissolved in 2 ml. of pyridine and reacted with 1 ml. of acetic anhydride overnight at room temperature. Quenching in water gives the acetate derivative, M.P. 145–146° C. after recrystallization from acetone-hexane.

The 1-cyclohexenyl or 1-cyclopentenyl ethers are prepared as follows: A mixture of 10 ml. of distilled cyclopentanone dimethyl ketal and 4.5 g. of 19-nor-B-nortestosterone with a trace of p-toluenesulfonic acid is placed in a flask equipped with a water trap. The mixture is heated at 150–175° C. bath temperature until the collection of distillate is complete. The residue is cooled, diluted with aqueous methanol with a few drops of pyridine then chilled to give 19-nor-B-nortestosterone 17-cyclopentenyl ether. The cyclohexenyl ether is similarly prepared using cyclohexanone dimethyl ketal.

Another portion of 19-nor-B-nortestosterone (1 g.) is heated at reflux with an excess of dihydropyran in benzene with a trace of p-toluenesulfonic acid. Concentration gives the tetrahydropyranyl ether of 19-nor-B-nortestosterone.

EXAMPLE 4

A mixture of 2 g. of 17α-methyl-19-nor-B-nortestosterone in 30 ml. of methanol is mixed with a solution of 0.5 g. of sodium borohydride in 5 ml. of water and 5 ml. of 10% sodium hydroxide solution. After 25 minutes at room temperature water is added. The mixture is extracted with methylene chloride. The dried solution is concentrated, ether is added then the mixture is concentrated again until crystallization of the 17α-methyl-19-nor-B-nor-4-androstene-3,17-diol begins.

This material (1.85 g.) in 30 ml. of methylene chloride and 2.5 g. of m-chloroperbenzoic acid is stirred for one hour then washed with water, alkali and water again. The dried organic layer is concentrated and ether added to separate 17α-methyl-19-nor-B-norandrostane-3,17-diol 4,5-epoxide.

A mixture of 1.35 g. of the epoxide in 75 ml. of acetone is cooled and treated rapidly with 2.5 ml. of Jones reagent (chromic oxide in sulfuric acid). After stirring for three minutes, 2.5 ml. of sodium bisulfite solution is added followed by 2.5 g. of sodium bicarbonate, 5.0 g. of sodium sulfate and 4 g. of a filter aid. The mixture is filtered. The filtrate is evaporated. The residue is taken up in ether, washed with water, alkali and water. The dried solution is concentrated to give the 3-ketone.

This material (900 mg.) with 20 ml. of chloroform and 2 g. of pyridine hydrochloride is stirred then refluxed overnight. The solution is evaporated to a thick oil which is taken up in ether and water. The ethereal layer is separated, washed, dried and concentrated. The addition of petroleum ether gives the desired 4-chloro-19-nor-B-17α-methyl-testosterone.

This material (1.5 g.), 125 ml. of tert.-butyl alcohol, 1.5 g. of potassium hydroxide and 25 ml. of water is refluxed under nitrogen overnight. Most of the alcohol is removed and water added to the residue. Extraction with methylene chloride gives 4-hydroxy-17-nor-B-nor-17α-methyl-testosterone. Acetylation at room temperature with acetic anhydride gives the 4-acetate derivative.

EXAMPLE 5

A mixture of 4.0 g. of 19-nor-B-nortestosterone acetate in 40 ml. of pyridine is cooled to −3° C. then 2.0 ml. of sulfuryl chloride added dropwise at 0° C. The cooled suspension is stirred for one hour then poured into acid-ice mixture. Extraction with methylene chloride gives 4-chloro-19-nor-β-nortestosterone acetate. Using sulfuryl bromide gives the 4-bromo derivatives.

EXAMPLE 6

In a flask fitted with a nitrogen inlet tube is placed 20.7 g. of 3β,19-diacetoxy-5B-hydroxy-17-oxo-B-nor-androstan-6-oic acid 5,6-lactone and the lactone is heated at 200–205° C. for 10–12 minutes or until the evolution of gas has stopped. The crude product is dissolved in 200 ml. of dry tetrahydrofuran and a solution of 248 ml. of 2 M methyl magnesium bromide in tetrahydrofuran-benzene is added dropwise over one hour. The solution is heated to reflux for two hours and allowed to sit overnight. Ammonium chloride solution, then iced diluted hydrochloric acid is used to hydrolyze the complex. The product is extracted into ethyl acetate and washed with diluted sodium bicarbonate solution and water. Evaporation of the dried solution gives crude 3β,17β,19-trihydroxy-17α-methyl-B-nor-androst-5-ene which is recrystallized from ethyl acetate or acetonehexane to give a M.P. 196–199° C. The analytical sample has a M.P. 200–202° C. $[\alpha]_{25}^{D} = -139$. (C=0.61% in CHCl$_3$).

A mixture of 10.2 g. of the trihydroxy compound, 52 ml. cyclohexanone and 310 ml. toluene is azeotroped until 250 ml. distillate has been collected. Then 3.7 g. of finely ground aluminum isopropoxide is added and heating is continued for 40–45 minutes with a slow distillation. The reaction is quenched with 4 ml. of water, the solids are filtered and leached with 3:1 ethyl acetate-methanol. The filtrates are concentrated to 100 ml., cooled and the product filter giving 17β,19-dihydroxy-17α-methyl-B-norandrost-4-ene-3-one M.P. 190–196° C. Recrystallization from 1:1 acetone-methanol yields a melting point of 198–200° C. $[\alpha]_{25}^{D} = -27.8°$ (C=0.497 in MEOH).

$$\lambda_{max.}^{ETOH} = 242 \text{ m}\mu \ (\epsilon = 13,300)$$

A suspension of 4.7 g. of this compound in 280 ml. of acetone is treated dropwise at 0° C. with 20 ml. of standard Jones reagent (0.08 mole). The addition takes 10 minutes and mixture is stirred an additional 20 minutes at 0° C. The mixture is diluted with 2 l. of iced brine and extracted with ethyl acetate. After washing the organic extracts once with sodium chloride solution, the acid is extracted into 5% sodium carbonate solution, backwashed once with ethyl acetate and the alkaline extracts acidified in the cold with hydrochloric acid. The aqueous solution is thoroughly extracted with methylene chloride, the organics washed with saturated sodium chloride solution. The solution is dried and concentrated. The white crystalline 17β-hydroxy-17α-methyl-B - nor androst-4-ene-3-one-19-oic acid was recrystallized from ethyl acetate giving a melting point of 175–176° C. $[\alpha]_{25}^{D} = -4.85$ (C=0.324 in CHCl$_3$).

$$\lambda_{max.}^{ETOH} = 240 \text{ m}\mu \ (\epsilon = 13,400)$$

A solution of 2.6 g. of this compound in 26 ml. of pyridine is refluxed for three hours. The pyridine is evaporated in vacuo and the residue dissolved in 50 ml. methanol and 5 ml. of 10% sodium hydroxide solution then heated on the steam bath for 10 minutes. The methanol is evaporated and the residue triturated with water. The buff solid is washed well with water and recrystallized from aqueous methanol giving 19-nor-17α-methyl-B-nor testosterone with a melting point of 154–156° C. $[\alpha]_{25}^{D} = 60.5$ (C=0.197 in CHCl$_3$).

$$\lambda_{max.}^{ETOH} = 239 \text{ m}\mu \ (\epsilon = 16,000)$$

EXAMPLE 7

A mixture of 24.0 g. of 3β,19-dihydroxy-B-nor-androst-5-ene-17-one hydrate, 120 ml. of cyclohexanone and 72 ml. of toluene is azeotroped over a water trap. Then about 500 ml. of toluene is distilled out of the reaction flask, gradually slowing down the rate of distillation. To this concentrated solution is added all at once 6.0 g. of finely ground aluminum isopropoxide and heating is continued for 15 minutes, during which time the distillate is collected and not allowed to return to the reaction vessel. Then the temperature is adjusted to about 80° C. with an ice water bath and 6.0 ml. of water is added. After a few minutes the inorganic salts are filtered off and the filtrate steam distilled. The crude product is extracted into ethyl acetate, dried over sodium sulfate, concentrated and crystallized from acetone-hexane. There is obtained 19-hydroxy-B-nor androst-4-ene-3,17-dione with a melting point of 178–180° C.

$$\lambda_{max.}^{ETOH} = 241 \ m\mu \ (\epsilon = 12,700)$$

To a solution of 8.7 g. of 19-hydroxy-B-nor-androst-4-ene-3,17-dione in 160 ml. of acetone is added 24.0 ml. (0.096 mole) of standard Jones reagent (26.7 g. chromic acid dissolved in 23 ml. of sulfuric acid and diluted to 100 ml. with water) at 5° C. over a period of 25 minutes. The reddish-brown mixture is stirred an additional 10 to 15 minutes at 0–5° C., then poured into 1 l. of iced brine. The crude acid is extracted into methylene chloride (4× 250 ml.). The organic extracts are washed once with a little saturated sodium chloride solution, and then thoroughly extracted with 5% sodium carbonate solution (5× 150 ml.). The alkaline extracts are backwashed once with a little methylene chloride and then acidified in the cold with concentrated hydrochloric acid. The liberated acid is reextracted into methylene chloride, washed with salty water, dried (sodium sulfate) and the solvent evaporated to give a syrup which crystallized on standing. B-nor androst-4-ene-3,17-dione-19-oic acid having a melting point of 157–159° C.

A solution of 9.0 g. of crude, oily B-nor-androst-4-ene-3,17-dione-19-oic acid, 160 ml. acetic acid, 300 ml. methanol and 13.5 g. of Girards "T" reagent [see Gazzetta. Chem. Ital., 93 (5), 514 (1963)] is refluxed on the steam bath for two hours, then diluted with a solution of 17.8 sodium carbonate in 2½ l. of water (gas evolution). This solution with a pH 6–7 is extracted with ether (2×200 ml.). The aqueous layer acidified with concentrated hydrochloric acid to pH 1 and allowed to stand at room temperature for about two hours, then extracted repeatedly with methylene chloride. The organic extracts are washed with salty water, dried and evaporated to give a tan solid which is recrystallized from aqueous methanol giving 19-nor-B-nor-androst-4-ene-3,17-dione having a melting point of 151–153° C.

What is claimed is:
1. A compound of the formula:

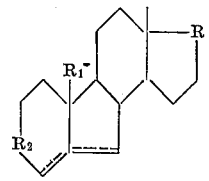

in which:

R is a member selected from the group consisting of

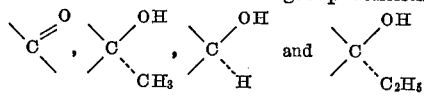

$R_1$ is a member selected from the group consisting of carboxy, hydroxymethylene and acyloxymethylene;

$R_2$ is a member selected from the group consisting of keto, β-hydroxymethylene and β-acyloxymethylene; and the vinyl group at the 4, 5 and 6 positions indicated by ---- is at a position selected from the group consisting of $\Delta^{4,5}$ and $\Delta^{5,6}$, said acyl groups being derived from carboxylic acids having a maximum of 8 carbon atoms.

2. 3β,19-dihydroxy-B-norandrost-5-ene-17-one.
3. 19-hydroxy-B-norandrost-5-ene-3,17-dione.
4. B-norandrost-4-ene-3,17-dione-19-oic acid.
5. 3β,17β,19-trihydroxy-17α-methyl - B - norandrost-5-ene.
6. 17β,19-dihydroxy-17α - methyl-B-norandrost-4-ene-3-one.
7. The method of preparing a 19 - carboxy - B - norandrostane comprising oxidation of a 19-hydroxymethylene-B-norandrostane using the Jones reagent.
8. The method of preparing a $\Delta^{4,5}$-19-nor-B-norandrostene-3-one comprising pyrolysis of a $\Delta^{5,6}$-B-norandrostene-3-one-10-oic acid in an excess of pyridine at reflux to form a $\Delta^{5,10}$-19-nor-B-norandrostene-3-one, then rearranging said $\Delta^{5,6}$-androstene by mild treatment with base.
9. 3β,19-diacetoxy-5,6-epoxyandrostan-17-one.
10. 3β,19-diacetoxy-5α-hydroxyandrostan-6,17-dione.
11. 3β,19-diacetoxy-5,17 - deoxo-5,6-secoandrostan-6-oic acid.
12. 3β,19-diacetoxy-5β-hydroxy-17-oxo - B - norandrostan-6-oic acid 5,6-lactone.
13. The method of preparing 19-nor-B-norandrost-4-ene-3,17-dione comprising reacting B-nor-androst-4-ene-3,17-dione-19-oic acid with Girard's T reagent under acid conditions then hydrolyzing the resulting Girard's T intermediate by acid treatment.

No references cited.

LEWIS GOTTS, *Primary Examiner.*

H. A. FRENCH, *Assistant Examiner.*